US012574688B2

(12) United States Patent
Warmuth et al.

(10) Patent No.: US 12,574,688 B2
(45) Date of Patent: Mar. 10, 2026

(54) METHOD FOR OPERATING A HEARING INSTRUMENT AND HEARING SYSTEM WITH SUCH A HEARING INSTRUMENT

(71) Applicant: Sivantos Pte. Ltd., Singapore (SG)

(72) Inventors: Julia Warmuth, Erlangen (DE); Christoph Kukla, Erlangen (DE); Sven Schön, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 225 days.

(21) Appl. No.: 18/421,072

(22) Filed: Jan. 24, 2024

(65) Prior Publication Data

US 2024/0276158 A1 Aug. 15, 2024

(30) Foreign Application Priority Data

Feb. 9, 2023 (DE) ..................... 10 2023 201 075.5

(51) Int. Cl.
*H04R 25/00* (2006.01)

(52) U.S. Cl.
CPC .................................... *H04R 25/43* (2013.01)

(58) Field of Classification Search
CPC ..... H04R 1/1041; H04R 25/305; H04R 25/43
USPC .......................................................... 381/312
See application file for complete search history.

(56) References Cited

U.S. PATENT DOCUMENTS

| | | | |
|---|---|---|---|
| 10,959,008 B2 | 3/2021 | El Guindi et al. | |
| 2020/0310539 A1 | 10/2020 | Barachant et al. | |
| 2020/0314525 A1 | 10/2020 | Thielen | |
| 2024/0373177 A1* | 11/2024 | Krieg .................. | H04R 1/1041 |

FOREIGN PATENT DOCUMENTS

| | | |
|---|---|---|
| CN | 110891235 A | 3/2020 |
| EP | 1930835 A1 | 6/2008 |
| EP | 3291573 A1 | 3/2018 |
| EP | 4120283 A2 | 1/2023 |

* cited by examiner

*Primary Examiner* — Phylesha Dabney
(74) *Attorney, Agent, or Firm* — Laurence A. Greenberg; Werner H. Stemer; Ralph E. Locher

(57) ABSTRACT

A method for operating a hearing instrument worn in or on the ear and a hearing system having such a hearing instrument. In operation of the hearing instrument, an action of the hearing instrument or an external functional unit connected thereto can be triggered by a multiple, in particular double, finger tap on the hearing instrument. In a multiple tap test step, a multiple tap prompt to execute the multiple finger tap is output to the user. By way of a sensor integrated in the hearing instrument, in particular an acceleration sensor or a gyroscopic sensor, a measurement signal is detected which contains a signature of the executed multiple finger tap. The measurement signal is compared with a stored multiple tap pattern for the multiple finger tap. Feedback is output to the user as to whether the signature contained in the measurement signal corresponds to the multiple tap pattern.

16 Claims, 1 Drawing Sheet

Figure 1:
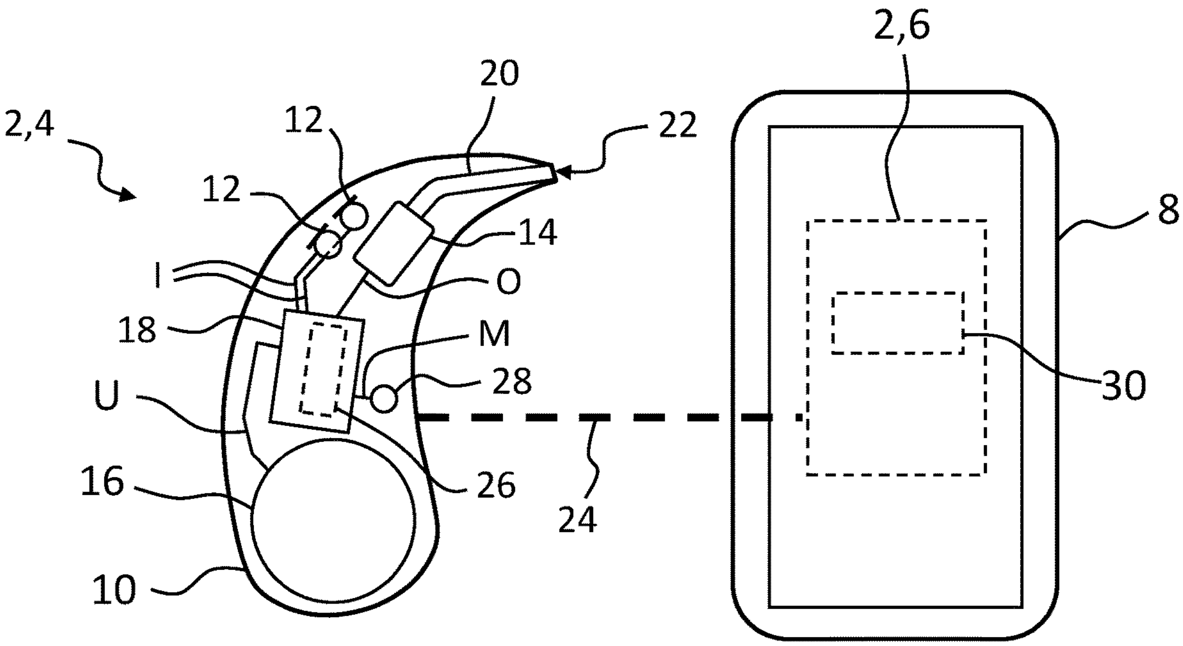

METHOD FOR OPERATING A HEARING INSTRUMENT AND HEARING SYSTEM WITH SUCH A HEARING INSTRUMENT

The invention relates to a method for operating a hearing instrument worn in or on the ear of a user. The invention furthermore relates to a hearing system having such a hearing instrument.

A hearing instrument generally refers to an electronic device, which assists the hearing ability of a person wearing the hearing instrument (designated hereinafter as the "wearer" or "(hearing aid) user"). In particular, the invention relates to hearing instruments configured to compensate entirely or partially for a hearing loss of a hearing impaired user. Such a hearing instrument is also designated as a "hearing aid". In addition, there are hearing instruments which protect or improve the hearing ability of users having normal hearing, for example, are to enable improved speech comprehension in complex hearing situations. Such devices are also designated as "personal sound amplification products" (abbreviation: PSAP). Finally, the term "hearing instrument" in the sense used here also includes headphones worn on or in the ear (wired or wireless and with or without active interference noise suppression), headsets, etc.

Hearing instruments in general and hearing aids especially are usually designed to be worn on the head and in particular here in or on an ear of the user, in particular as behind-the-ear devices (BTE) or in-the-ear devices (ITE). With respect to their internal structure, hearing instruments generally have at least one output transducer, which converts an output audio signal supplied for the purpose of output into a signal perceptible as sound to the user, and outputs the latter to the user.

In most cases, the output transducer is designed as an electroacoustic transducer, which converts the (electric) output audio signal into airborne sound, wherein this output airborne sound is emitted into the auditory canal of the user. With a hearing instrument worn behind the ear, the output transducer, also designated as a "receiver", is usually integrated outside the ear in a housing of the hearing instrument. The sound output by the output transducer is conducted in this case by means of a sound tube into the auditory canal of the user. Alternatively thereto, the output transducer can also be arranged in the auditory canal, and thus outside the housing worn behind the ear. Such hearing instruments are also referred to as RIC devices according to the English designation "receiver in canal". Hearing instruments worn in the ear, which are dimensioned so small that they do not protrude outward beyond the auditory canal, are also referred to as CIC devices (according to the English term "completely in canal").

In further structural forms, the output transducer can also be designed as an electromechanical transducer, which converts the output audio signal into structure-borne sound (vibrations), wherein this structure-borne sound is emitted, for example, into the skull bones of the user. Furthermore, there are implantable hearing instruments, in particular cochlear implants, and hearing instruments, the output transducer of which directly stimulates the auditory nerve of the user.

In addition to the output transducer, a hearing instrument often has at least one (acoustoelectric) input transducer. In operation of the hearing instrument, the or each input transducer records airborne sound from the surroundings of the hearing instrument and converts this airborne sound into an input audio signal (i.e., an electrical signal which transports information about the ambient sound). This input audio signal—also designated as a "recorded sound signal"—is often forwarded to an external device, e.g., for recording (storage) purposes or for outputting to a remote conversation partner. However, the input audio signal is regularly (possibly also) output in original or processed form to the user himself, for example, for implementing a so-called transparency mode in a headphone, for active interference sound suppression, or—for example in a hearing aid—for achieving improved sound perception of the user.

Moreover, a hearing instrument often has a signal processing unit (signal processor). The or each input audio signal is processed (i.e., modified with respect to its sound information) in the signal processing unit. The signal processing unit outputs a correspondingly processed audio signal (also designated as an "output audio signal" or "modified sound signal") at the output transducer and/or at an external device here.

The term "hearing system" designates a single device or group of devices and possibly nonphysical functional units which together provide the functions required during operation of a hearing instrument. The hearing system can in the simplest case consist of a single hearing instrument. Alternatively hereto, the hearing system can comprise two cooperating hearing instruments for treating both ears of the user. In this case, this is referred to as a "binaural hearing system". Additionally or alternatively, the hearing system can comprise at least one further electronic peripheral device, for example, a remote control, a charger, or a programming device for the or each hearing instrument. In modern hearing systems, instead of a remote control or a dedicated programming device, a control program is often provided, in particular in the form of a so-called app (referred to hereinafter as an "operating app"), wherein this control program is designed for installation on an external computer, in particular a smartphone or tablet. The external computer is generally not part of the hearing system itself here, as far as it is usually provided independently from the hearing system and also not by the producer of the hearing system.

To simplify the operation of such a hearing system, it is sometimes provided that the user can control one or more functions of the hearing instrument or an external functional unit (i.e., a peripheral device or an operating app) by interaction with the hearing instrument. Typical examples of such functions are accepting and ending a telephone call received at the external functional unit.

A method for operating a hearing instrument and a hearing system having such a hearing instrument are known from U.S. Pat. No. 10,959,008 B2, in which the user can trigger functions of the hearing instrument or a smartphone connected thereto, such as changing the volume of the output signal, switching between auditory programs of the hearing instrument, or accepting and ending telephone calls by a tap control, namely by a single or multiple finger tap on the hearing instrument, the ear, or the head. The acceleration acting on the hearing instrument is detected here by means of an acceleration sensor. A tap event is identified when the detected acceleration meets specific stored criteria.

In practice, the use of such a tap control often proves to be susceptible to error, however. On the one hand, this is because many users have difficulty in becoming familiar with this control method, which is largely unusual in their daily life; this relates above all to older users, users having motor restrictions, and users who have little or no experience with input means of modern electronic devices (computer mouse, touchscreen, etc.). On the other hand, it has been shown that the intuitive tap behavior of various users has strongly individual deviations. A highly complex problem in the implementation of a conventional tap control is therefore distinguishing real tap events, which were intentionally performed by the user to trigger a function, from interfering events such as arbitrary touches and other shocks. Negative identification errors (false negatives), in which an intentionally performed tap event is not identified by the tap controller, and positive identification errors (false positives), in which an interfering event is incorrectly identified as a tap event, have an unfavorable correlation here, however. The more non-specifically the criteria for identifying a tap event are designed, the more reliably real tap events are identified, but the greater the probability of positive identification errors is also. On the other hand, the probability of negative identification errors rises the more specifically (strictly) the criteria for identifying a tap event are designed.

According to the teaching of U.S. Pat. No. 10,959,008 B2, this problem is to be solved in that the individual tap behavior of the user is learned. For this purpose, a tap task is assigned to the user, upon which the user executes a single or multiple finger tap. The stored criteria for identifying the tap event are adapted on the basis of this finger tap carried out by the user. The adaptation to the individual tap behavior generally enables, with users having consistent tap behavior, the criteria for identifying the tap event to be designed comparatively strictly, without having to accept a strong accumulation of negative identification errors.

However, the individual adaptation of the tap identification does not provide great improvement of (and in some cases possibly even worsens) the operating friendliness for users who themselves do not have constant tap behavior or the individual tap behavior of whom corresponds to a typical interference pattern. Both apply particularly frequently to users who have problems in any case with the familiarity with a tap control due to advanced age, little experience with electronic input means, or motor restrictions.

The invention is based on the object of improving the operating friendliness in operation of a hearing instrument worn in or on the ear of a user. In particular, the frequency of (positive and negative) identification errors during the use of a tap control is to be kept low in operation of the hearing instrument.

This object is achieved according to the invention with respect to a method for operating a hearing instrument worn in or on the ear of a user by the features of claim 1. The above object is achieved according to the invention with respect to a hearing system by the features of claim 15. Advantageous embodiments and refinements of the invention, which are partially inventive considered as such, are described in the dependent claims and the following description.

The invention proceeds from a hearing instrument which is designed for a tap control, i.e., from a hearing instrument, in operation of which an action of the hearing instrument or an external functional unit connected thereto is triggerable by a multiple, in particular double finger tap on the hearing instrument.

Notwithstanding the teaching of U.S. Pat. No. 10,959,008 B2, in this case the tap control of the hearing instrument is not adapted to the individual tap behavior of the user. Rather, the invention is based on the concept of training the user on a specific tap behavior expected by the hearing instrument and assisting this training particularly effectively. According to the invention, for this purpose a multiple tap prompt to execute the multiple finger tap (multiple tap) is output to the user in a multiple tap test step. By means of a sensor integrated in the hearing instrument, a measurement signal is detected which contains a signature of the executed multiple tap. The measurement signal is compared to a stored multiple tap pattern for the multiple finger tap. Feedback is output to the user as to whether the signature contained in the measurement signal corresponds to the multiple tap pattern. In the general case, the multiple tap in the scope of the invention can comprise an arbitrary plurality (for example, two, three, four, etc.) of individual tapping movements (single taps). However, the multiple tap is preferably a double tap, which is formed from precisely two single taps.

The multiple tap prompt output to the user at the beginning of the multiple tap test step can be output in the scope of the invention, depending on the embodiment of the hearing system, in various forms perceptible and comprehensible to the user. In one embodiment of the hearing system, in which it only consists of the hearing instrument itself, the multiple tap prompt is preferably output to the user acoustically, in particular in the form of spoken language by means of the hearing instrument. In embodiments of the hearing system which have an external peripheral device, such as a remote control, in addition to the hearing aid, the multiple tap prompt (for example again in acoustic form and/or in visual form) can also be output by means of the peripheral device. If the peripheral device comprises a display screen, the multiple tap prompt is preferably output as text or video (with or without sound). The same applies accordingly in a hearing system which has an operating app installed on a smartphone in addition to the hearing instrument. In the latter case, the display screen of the smartphone is preferably used to output the multiple tap prompt.

The sensor integrated in the hearing instrument is preferably an acceleration sensor, the measurement signal of which reflects an acceleration acting on the hearing instrument. In general, the “signature” of the multiple tap designates the change induced by the tapping movement of the measurement signal detected by the sensor, for example, if the sensor is embodied as an acceleration sensor, the acceleration exerted by the tapping movement on the hearing instrument and measured. The signature induced by the multiple tap is expressed in each case (independently of the type of the sensor used) in multiple pulses (i.e., pulsed changes of the sensor signal), which each correspond to a single tapping movement of the multiple tap. The number of the pulses within the signature corresponds (in a multiple tap executed as expected) to the number of the individual tapping movements of the multiple tap. The signature of a double tap is thus to contain two pulses, the signature of a triple tap three pulses, etc.

Additionally or alternatively to the acceleration sensor, one or more other sensors integrated in the hearing instrument can also be used to identify the multiple tap in the scope of the invention, e.g.,

- a gyroscopic sensor, which detects as the signature of the finger tap a tilt (i.e., rotational movement) of the hearing instrument induced thereby,
- a microphone (for example, the possibly provided at least one input transducer of the hearing instrument), which detects as the signature of the finger tap a sound induced thereby,
- a capacitive sensor, which detects as the signature of the finger tap a capacitance change induced by the approach of a finger of the user,
- a resistive sensor, which detects as the signature of the finger tap a resistance change induced by the touch of the hearing instrument by the finger of the user, or an optical sensor, which detects as the signature of the finger tap a shading induced by the approach of a finger of the user or the touch of the hearing instrument by the finger of the user.

In general, the multiple tap pattern contains one or more criteria, on the basis of which the signature of a multiple tap executed as expected can be identified upon the evaluation of the measurement signal supplied by the sensor, in order to distinguish the multiple tap from other events influencing the measurement signal. In one preferred design, the multiple tap pattern is defined here such that it contains a limiting value or permitted range for a time interval between the pulses of the signature caused by the multiple finger tap and a limiting value or permitted range for the amplitude of the pulses of the signature caused by the multiple finger tap. For example, those pulses are extracted from the sensor signal, the amplitude of which lies within a range defined in the scope of the multiple tap pattern. A double tap executed as expected is identified here, for example, in that a second pulse having an amplitude in the permitted range follows a first pulse extracted in this manner within a predetermined time window.

The feedback output to the user can be output in the scope of the invention, like the multiple tap prompt, in various forms perceptible and comprehensible to the user depending on the embodiment of the hearing system, in particular in acoustic and/or visual form, text based, or in the form of a video. Reference is accordingly made to the above statements on the multiple tap prompt.

In simple embodiments of the invention, the feedback contains solely qualitative information, thus exhausts itself in the statement as to whether the signature contained in the measurement signal corresponds to the multiple tap pattern or not. In differentiated embodiments of the invention, in the negative case (i.e., when the measurement signal does not correspond to the stored multiple tap pattern), the feedback alternatively or additionally contains information about which aspect (for example with respect to which of multiple criteria) the signature of the tapping movement of the user contained in the measurement signal does not correspond to the multiple tap pattern. In one preferred variant, the feedback contains information about the deviation of the time interval or the amplitude from the respective limiting value or permitted range stored in the scope of the multiple tap pattern. This differentiated information can also be qualitative in the scope of the invention (e.g., “tap too strong”, “tap too weak”, “taps too fast”, or “taps too slow”). Additionally or alternatively, the feedback in the scope of the invention can also contain quantitative information about the deviation of the time interval or the amplitude from the respective limiting value or permitted range, e.g., in the form of a graphic bar diagram, which displays the strength and direction of the deviation of the time interval or the amplitude of the pulses from a target value.

In a further embodiment of the invention, in which an acceleration sensor or gyroscopic sensor is used as the sensor, a multiple tap is only identified as such when it is performed by the user in an expected direction (or, equivalently, at a specific point of the hearing instrument). For this purpose, only a predetermined directional component of the detected acceleration pulses or rotational movement pulses of the measurement signal is compared to the multiple tap pattern. Alternatively, the multiple tap pattern contains a limiting value or permitted range for the direction of the acceleration pulses or rotational movement pulses, to which (limiting value or permitted range) the measured value of the (multi-dimensionally measured) acceleration or rotational movement is compared.

The feedback output to the user contains in the latter case, when the measurement signal does not correspond to the stored multiple tap pattern with respect to a direction of the acceleration pulses or rotational movement pulses, (qualitative or quantitative) information about the deviation of the direction from the respective stored limiting value or permitted range.

As indicated above, the direction of the acceleration pulses or rotational movement pulses acting under a multiple tap on the hearing instrument correlates with the location (viewed relative to the hearing instrument) at which the user carries out the multiple tap. If the user carries out the finger tap on a rear side (facing to the rear from the viewpoint of the head of the user in the wearing position) of the hearing instrument, the acceleration pulses caused by the multiple tap are directed forward; when the user carries out the finger tap on an upper side (facing upward from the viewpoint of the head of the user in the wearing position) of the hearing instrument, the acceleration pulses caused by the multiple tap are directed downward; etc. In consideration of this correlation, in one advantageous embodiment of the invention, the location (on the hearing instrument) at which the user has executed the multiple tap is calculated from the direction of the measured acceleration pulses or rotational movement pulses. The feedback output to the user preferably contains here, if the measured acceleration does not correspond to the stored multiple tap pattern with respect to the direction of the acceleration pulses, (qualitative or quantitative) information for the deviation of the location of the multiple tap from a target position corresponding to the multiple tap pattern (for example, in the form of one of the statements “tap higher”, “tapped too low”, etc.).

In one preferred application of the invention, the tap control is used to accept or end a telephone conversation on a telephone connected for data transmission to the hearing instrument. The telephone is preferably a mobile telephone here, in particular a smartphone. Furthermore, it would also be conceivable in the scope of the invention that the double tap is used to accept a doorbell call (=intercom) or to control a smart speaker (quieter via double tap on left hearing aid and louder via double tap on right hearing aid), activate or deactivate a digital assistant, etc.

However, in principle, this variant of the invention can also be used in the same manner with a landline telephone or soft phone (i.e., telephony software implemented on a computer) connected to the hearing instrument. In the corresponding variant of the method according to the invention, at least the multiple tap prompt is designed as a simulation of a telephone call in the multiple tap test step. In this sense, the multiple tap prompt—preferably after prior information of the user and optional release by the user—simulates the usual announcement of a telephone call by means of the hearing instrument; in particular, a ring tone is output to the user as the multiple tap prompt by means of the hearing instrument, to which the user is supposed to react with the multiple tap. In this variant, moreover the feedback output to the user in the multiple tap test step is also preferably designed as a (continued) simulation of the telephone call, in any case when the user has previously delivered a multiple tap identified as correct and has thus accepted the simulated telephone call; for this purpose, the feedback is output to the user by means of the hearing instrument in the form of a speech message. The ending of the telephone call can be designed in the scope of the invention in a similar manner as a simulated telephone call, in that the user (after the acceptance of the simulated telephone call by multiple tap) is prompted by a speech message output via the hearing instrument to carry out a renewed multiple tap. In this case, for example, a further speech message or a signal tone is output as the feedback.

In an optional refinement of this inventive concept, the user is prompted in the scope of the simulated telephone call to deliver a speech sample (i.e., a text spoken by the user), wherein this speech sample is recorded by the hearing instrument or an external functional unit of the associated hearing system and subsequently played back to the user via the hearing instrument—to confirm the successful speech recording and to demonstrate the speech quality.

The simulated telephone call can in principle be carried out in a simple embodiment of the invention solely by the hearing instrument. An actually existing data transfer connection of the hearing instrument to a telephone is not absolutely necessary for this purpose. However, in terms of the most realistic possible simulation, the simulated telephone call is only carried out in an expedient method variant when the hearing instrument has actually established a functioning connection to a telephone, in particular a smartphone having an operating app of the hearing system installed thereon. In this case, the feedback about the successful performance of the multiple tap by the user (and therefore the acceptance or ending of the simulated telephone call) is preferably also displayed on the telephone.

In a further advantageous embodiment of the invention, together with or subsequently to the multiple tap prompt to assist the user in executing the multiple finger tap, a rhythmic prompt sound is output to the user by means of the hearing instrument, the rhythm of which correlates with the time sequence of individual pulses (i.e., expected single taps) within the multiple tap pattern. In the above—described embodiment of the multiple tap test step as a simulated telephone call, the rhythmic prompt sound, for example, forms the above-mentioned ring tone, which accompanies the multiple tap prompt. The rhythmic prompt sound can be, for example, a sequence of individual chronologically brief tones (for example, like clicking or striking noises), the time interval of which corresponds to the time sequence of individual finger taps within the multiple tap pattern. The rhythmic prompt sound can also be designed as a piece of music or rhythmic language, however, the rhythm of which is matched to the time sequence of individual finger taps within the multiple tap pattern; in particular, beats of this rhythm are in the same time interval as the individual finger taps within the finger tap pattern.

The output of a rhythmic prompt sound of the above-described type to assist the user interaction with the hearing instrument is optionally also used in a refinement of the inventive concept outside the multiple tap test step and independently thereof in situations in which a multiple finger tap of the user is expected as a response to an event; for example, to announce an actual (i.e., not simulated) incoming telephone call in normal operation of the hearing instrument. This refinement is viewed as an independent invention. The user is effectively assisted in the correct interaction with the hearing instrument by the output of the rhythmic prompt sound, in that he only has to knock along with the rhythm specified by the prompt sound in order to trigger an action linked to the multiple tap (for example, accept the incoming telephone call). Instead of the prompt sound, a rhythmic vibration of a smartphone connected to the hearing instrument can also be triggered in the scope of the invention.

Both in the scope of the multiple tap test step and in applications independent thereof, the output of the rhythmic prompt sound also facilitates the use of complex multiple tap patterns, which do not solely consist of two or more single taps following one another at equal time intervals; for example, the use of a multiple tap pattern which consists of two single taps following one another at a shorter time interval, followed by two single taps following one another at a longer time interval. Such complex multiple tap patterns advantageously enable the implementation of a tap control having a high level of insensitivity to interfering events (and thus a very low probability of positive identification errors).

Additionally or alternatively to the rhythmic prompt sound, a haptically perceptible pattern can also be triggered in the scope of the invention, in particular a vibration of the hearing aid or a smartphone connected thereto for data transmission, wherein this pattern has a rhythm matched to the time sequence of individual finger taps within the multiple tap pattern.

In one advantageous embodiment of the invention, in addition to carrying out the multiple tap test step, a single tap test step is carried out in which the user is prompted to perform a single finger tap. The additional single tap test step is used for the purpose of a graduated (and thus more effective) training of the user to carry out the multiple tap. In the scope of the invention, for example, the single tap test step can always be carried out chronologically before the multiple tap test step, so that the user is first trained as a standard in carrying out individual tapping movements, before he is prompted to execute a multiple tap. Alternatively, however, it can also be provided in the scope of the invention that the single tap test step is carried out chronologically after the multiple tap test step, in particular only when previously one or more multiple tap test steps (for example, in 3 or 5 carried out in succession) have failed, i.e., when the user has failed to perform a proper multiple tap (thus corresponding to the multiple tap pattern) in the one or more preceding multiple tap test steps. In a refinement of this embodiment variant, the single tap test step is only carried out when an evaluation of the tap behavior of the user in one or more failed multiple tap test steps has previously had the result that the user has carried out the tapping movement too strongly, too weakly, and/or in the wrong direction (or at an incorrect point of the hearing instrument) in this at least one preceding multiple tap test step.

In principle, the single tap test step is carried out analogously to the multiple tap test step in that the user is initially prompted to perform the tapping movement in that the measurement signal is detected upon the prompt by means of the sensor integrated in the hearing instrument and compared to a stored pattern, and in that the user subsequently receives feedback about the success or failure of the test step. The above explanations of various embodiment variants of the multiple tap test step are therefore also to be transferred accordingly to the single tap test step. Notwithstanding the multiple tap test step, however, a single tap prompt is output to the user, using which the user is prompted to perform the single finger tap (single tap) in the single tap test step (instead of the multiple tap prompt), for example, visually by means of the peripheral device and/or acoustically by means of the peripheral device or the hearing instrument. Accordingly, the measurement signal detected by the sensor contains a signature of the single tap performed by the user here (instead of the signature of the multiple tap), and the detected measurement signal is also compared here to a corresponding stored single tap pattern (instead of the multiple tap pattern used for the multiple tap test step). Finally, the feedback output in the single tap test step contains information as to whether the signature contained in the measurement signal corresponds to the single tap pattern. Also analogously to the multiple tap test step, the sensor used is preferably an acceleration sensor or a gyroscopic sensor. The detected measurement signal is preferably accordingly an acceleration signal or rotational movement signal.

In a further embodiment variant of the invention, in addition to the multiple tap test step, an instruction step is carried out in which (for example visually by means of the peripheral device and/or acoustically by means of the peripheral device or the hearing instrument, e.g., in the form of a displayed text, a spoken text, or a video which is muted or backed with sound), an instruction is output to the user to carry out the multiple finger tap. The additional instruction step is used for the theoretical introduction of the user to the proper performance of the multiple tap. In the scope of the invention, for example, the instruction step can always be carried out before the multiple tap test step (or possibly the single tap test step) with respect to time. Alternatively, however, it can also be provided in the scope of the invention that the instruction step is carried out after the multiple tap test step with respect to time, in particular only when previously one or more multiple tap test steps have failed (for example, in 3 or 5 carried out in succession), i.e., when the user has failed to perform a proper multiple tap (thus corresponding to the multiple tap pattern) in the one or more preceding multiple tap test steps.

As already indicated above, the multiple tap test step is preferably carried out as one step in a series of multiple steps, which are used in their entirety for training the user for the proper performance of the multiple tap. The method in other words comprises, preferably in addition to the multiple tap test step (executed once), one or more further auxiliary steps. These auxiliary steps are selected here in particular from a group which contains

- the above-described single tap test step (according to claim 9),
- the above-described instruction step (according to claim 10), and
- a repeated execution of the multiple tap test step.

A selection is preferably made here about the type and number of the further auxiliary steps and the sequence of the multiple tap test step and the further auxiliary steps. This selection takes place here depending on

- personal data on the user (i.e., data which characterize the user, such as age, sex, and/or experience with electronic communication devices and/or digital information) and/or
- a preceding interaction of the user with the hearing instrument (i.e., the usage history, in particular statistics on successful and failed multiple tap test steps) and/or
- at least one environmental condition (for example the signal-to-noise ratio of the acceleration signal recorded by the acceleration sensor).

The term “number of the auxiliary steps” used above and in particular the use of the plural form for the auxiliary steps also comprises the case here that in the course of the selection, only one single auxiliary step is selected in addition to the multiple tap test step (carried out once). In other words, the “number of the auxiliary steps” can also be one.

In one example, the selection of the number of the auxiliary steps and the sequence of the steps takes place depending on personal data on the user (namely the age of the user and/or the technical affinity of the user, i.e., the experience of the user with modern electronic terminals such as hearing instruments, mobile telephones, etc.), in that

- with a younger user (for example at an age less than 65 years) or a user with affinity for technology, only the instruction step is carried out, followed by the multiple tap test (optionally designed as a call simulation), while
- with an older user (for example at an age of 65 years or more) or a user having little affinity for technology, the single tap test step is additionally carried out between the instruction step and the multiple tap test.

The age of the user and a degree of the technical affinity are preferably queried before carrying out the above-mentioned steps, for example, by means of an input mask of the operating app.

In another example, the selection of the number of the auxiliary steps and the sequence of the steps takes place depending on the usage history of the user, in that (as already mentioned above) the single tap test is only carried out if previously one or more prior multiple tap tests have failed.

In a further example, the selection of the number of the auxiliary steps and the sequence of the steps takes place depending on environmental conditions (namely the signal-to-noise ratio of the measurement signal detected by the sensor), in that the multiple tap test is carried out multiple times in succession as a standard if the signal-to-noise ratio of the measurement signal falls below a limiting value; if the sensor is embodied as an acceleration sensor, this case typically occurs when the user is subjected to strong vibrations while carrying out the method (for example, while traveling in public transportation on uneven ground).

Additionally or alternatively to the selection of the number and sequence of the auxiliary steps, in one preferred embodiment of the method, the performance of the multiple tap test step is varied depending on the personal data on the user and/or the preceding interaction of the user with the hearing instrument and/or at least one environmental condition (as described in more detail above).

In one example, the performance of the multiple tap test step is varied depending on personal data on the user (namely the age of the user), in that

- with a younger user (for example at an age less than 50 years), the multiple tap prompt and/or feedback on an impermissible speed, an impermissible strength, or an impermissible direction of the individual tapping movements of the attempted multiple tap are output in graphic form (for example in the context of a computer game in the context of an operating app installed on a smartphone of the user), while
- with an older user (for example at an age of 50 years or more), the multiple tap prompt and/or feedback are output in text-based form (for example in spoken form via the hearing instrument or as a text display of the operating app).

In another example, the performance of the multiple tap test step is varied in dependence on the usage history, in that

- specific feedback is carried out on impermissible speed, impermissible strength, or impermissible direction of the individual tapping movements of the attempted multiple tap (i.e., individual training of the tap speed, strength, or direction) only upon failing multiple (for example more than 10) prior multiple tap tests, while
- after a single or initial failure of the multiple tap test, only simple qualitative feedback is output (for example in the form of the text message “multiple tap not recognized”).

In a further example, the performance of the multiple tap test step is varied depending on environmental conditions (namely the signal-to-noise ratio of the measurement signal detected by the sensor), in that

- specific feedback on impermissible speed, impermissible strength, or impermissible direction of the individual tapping movements of the attempted multiple tap is only output if the signal-to-noise ratio of the measurement signal falls below a limiting value, while
- otherwise only simple qualitative feedback is output (for example in the form of the text message "multiple tap recognized" or "multiple tap not recognized").

The single tap pattern used in the single tap test step is preferably specified such that it corresponds with respect to the amplitude and/or possibly the direction of the pulse of the measurement signal caused by the single finger tap, if an acceleration sensor or gyroscopic sensor is used, thus with respect to the amplitude and/or possibly the direction of the acceleration pulses or rotational movement pulses induced by the single finger tap, to the multiple tap pattern used in the multiple tap test step. The single tap pattern therefore requires a single finger tap which is executed with the same strength or in the same direction (i.e., at the same point of the hearing instrument) as the single finger taps within the multiple tap corresponding to the multiple tap pattern.

In a further embodiment of the method, a selection from multiple different variants of the instruction is made in the instruction step depending on personal data on the user (as described above).

In one example, a selection is made depending on the age of the user between a first variant of the instruction in the form of a solely text-based introduction and a second variant of the instruction in the form of a training video; for example, the training video is output to a younger user (for example, at an age less than 60 years), while the solely text-based introduction is output to an older user (for example, from an age of 60 years).

In another example, a selection is made between various training videos depending on the age of the user.

The hearing system according to the invention comprises a hearing instrument wearable in or on the ear of a user having a sensor integrated therein, which is generally designed to detect a tapping movement of the user on the hearing instrument. In other words, the sensor generates a measurement signal in which a signature of a multiple finger tap is contained when the user executes such a multiple finger tap on the hearing instrument. The hearing system furthermore comprises a finger tap recognition unit which is designed to recognize a multiple, in particular double finger tap on the hearing instrument by comparing the measurement signal to the stored multiple tap pattern and to trigger an action of the hearing instrument or an external functional unit connected thereto upon recognition of the multiple finger tap. The hearing system additionally comprises a multiple tap training unit, which is designed to carry out the above-described multiple tap test step.

In the scope of the hearing system according to the invention, the finger tap recognition unit and the multiple tap training unit can alternately be designed as a nonprogrammable hardware unit (for example, in the form of an ASIC) or as a software module or as a combination of nonprogrammable hardware components and software. Furthermore, the finger tap recognition unit and the multiple tap training unit can alternately be implemented in the scope of the invention each integrated in a single structural unit (for example an ASIC chip) or distributed onto multiple structural units. Moreover, the finger tap recognition unit and the multiple tap training unit or components thereof can also be integrated in a common structural unit.

In a simple embodiment of the invention, the hearing system is exclusively formed of the hearing instrument. In this case, the finger tap recognition unit and the multiple tap training unit are also completely integrated in the hearing instrument. However, the hearing system preferably comprises, in addition to the hearing instrument, at least one external functional unit (i.e., spatially separated from the hearing instrument or implemented separately), which is connected in operation of the hearing system via a wireless or wired data transmission link to the hearing instrument. The external functional unit is, for example, an independent electronic peripheral device (as described above) or an operating app (as also described above). In the latter cases, preferably at least one component of the finger tap recognition unit and/or the multiple tap training unit is implemented in the external functional unit, for example, as a software module of the operating app. If the external functional unit is formed by an operating app, it uses the communication services (for example, a Bluetooth transceiver), corresponding to the data link connection, of an electronic device generally not associated with the hearing system (for example, a mobile telephone or tablet computer), on which it is installed. The multiple tap training unit or parts thereof can moreover also be implemented in a cloud server in the scope of the invention.

The hearing instrument can be provided in the scope of the invention in an arbitrary structural form (in particular as described at the outset), e.g., as a BTE, RIC, or ITE device, as an implanted device, or as headphones. In one preferred application of the invention, the hearing instrument is a hearing aid.

The hearing system according to the invention is generally designed for automatically performing the method according to the invention. The above-described variants of the method correspond here to corresponding variants of the hearing system, so that the above statements on details, options, functions, and effects of method variants are to be transferred to the respective corresponding device variants, and vice versa. As far as the above statements on embodiments of the invention are not expressly related to the method or the hearing system, these statements relate to both the method and the hearing system.

Figure 2:
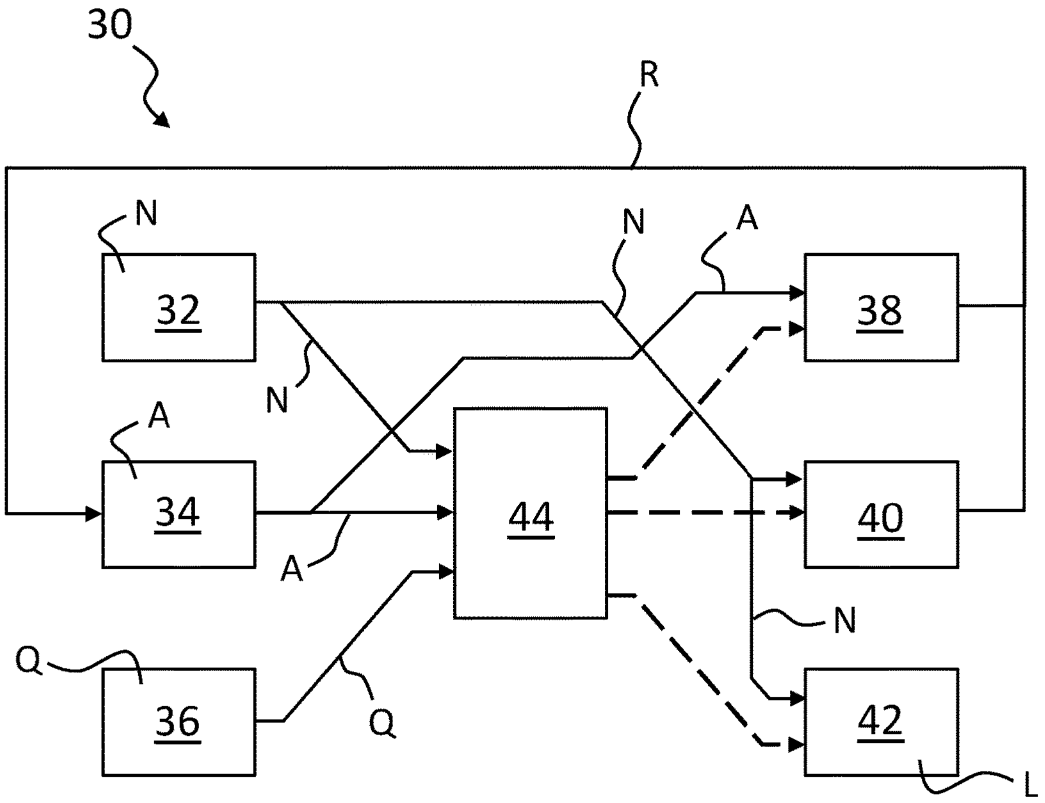

Exemplary embodiments of the invention are explained in more detail hereinafter on the basis of a drawing. In the figures:

FIG. 1 shows a schematic representation of a hearing system which is formed from a hearing aid and an operating app installed in a smartphone, and FIG. 2 shows a schematic block diagram of the structure of a learning system implemented as part of the operating app.

Parts and dimensions corresponding to one another are always provided with identical reference signs in all figures.

FIG. 1 shows a hearing system 2, which consists here of a hearing aid 4, i.e., a hearing instrument configured to assist the sense of hearing of a hearing-impaired user, and a software application (operating app 6). The hearing aid 4 in the example shown here is a BTE hearing aid wearable behind an ear of a user. The operating app 6 is installed in the operational state of the hearing system 2 on a programmable electronic device, such as a smartphone 8, wherein this electronic device itself is not part of the hearing system 2. Rather, the smartphone 8 is only used by the operating app 6 as a resource for storage space and computing power and communication services (i.e., hardware and software for data transmission).

Optionally, in a further embodiment of the invention, the hearing system 2 additionally comprises a second hearing aid (not expressly shown) to care for the second ear of the user, which corresponds in terms of its structure in particular to the hearing aid 4 shown in FIG. 1.

The hearing aid 4 comprises two microphones 12 as input transducers and a receiver 14 as an output transducer within a housing 10. The hearing aid 4 furthermore comprises a battery 16 and a central electronics unit, which is designated hereinafter as an audio processor 18. For example, the audio processor 18 comprises a microprocessor for central, software-implemented control functions and a signal processor (in particular digital) designed especially for processing audio signals. The audio processor 18 preferably contains at least one programmable subunit and at least one nonprogrammable subunit in this case. In particular, the signal processor is preferably composed of nonprogrammable and programmable components.

The audio processor 18 is supplied with an electrical supply voltage U from the battery 16.

In normal operation of the hearing aid 4, the microphones 12 each record airborne sound from the environment of the hearing aid 4. The microphones 12 convert the sound into (input) audio signals I, which contain information about the recorded sound. The input audio signals I are supplied inside the hearing aid 4 to the audio processor 18 (and here in particular the signal processor), which modifies these input audio signals I to assist the sense of hearing of the user.

The audio processor 18 outputs an (output) audio signal O, which contains information about the processed and thus modified sound, at the receiver 14.

The receiver 14 converts the output sound signal O into a modified airborne sound. This modified airborne sound is transmitted into the auditory canal of the user via a sound pathway 20, which connects the receiver 14 to a tip 22 of the housing 10, and via a flexible sound tube (not explicitly shown), which connects the tip 22 to an earpiece inserted into the auditory canal of the user.

The hearing aid 4 and the operating app 6 exchange data via a wireless data transmission link 24 in operation of the hearing system 2. The data transmission link 24 is based, for example, on the Bluetooth LE standard. The hearing app 6 accesses a Bluetooth transceiver of the smartphone 8 for this purpose, in order to receive data from the hearing aid 4 and send data thereto. The hearing aid 4 in turn comprises a Bluetooth transceiver (not explicitly shown), to send data to the operating app 6 and receive data from this operating app 6.

To implement a tap control for one or more functions of the hearing aid 4 and/or the operating app 6, the hearing system 2 comprises a finger tap recognition unit 26. In the example shown in FIG. 1, the finger tap recognition unit 26 is designed as a software module, which is installed and executable in the audio processor 18 of the hearing aid 4 (and in particular in the microcontroller therein). Alternatively, the finger tap recognition unit 26 is formed as nonprogrammable hardware (i.e., as a nonprogrammable electronic circuit, in particular in the form of an ASIC or a part thereof) or as a combination of nonprogrammable hardware and software.

To recognize tapping movements, which the user executes on the housing 10 of the hearing aid 4, the finger tap recognition unit 26 accesses a measurement signal M of an acceleration sensor 28 also integrated in the hearing aid 4. In the illustrated example, the acceleration sensor 28 is a three-axis acceleration sensor which, in addition to the strength, also measures the direction of the acceleration acting on the hearing aid 4 in a time-resolved manner.

Two functions of the operating app 6, which can be triggered by means of the tap control in the example according to FIG. 1, are accepting an incoming telephone call on the smartphone 8 and ending a telephone call made by means of the smartphone 8.

In order to keep the probability low of an incorrect recognition of a finger tap (thus a positive recognition error, as described above), delivering a multiple, namely double finger tap ("double tap") on the housing 10 of the hearing aid 4 is requested by the finger tap recognition unit 26 to trigger one or more specific functions, in particular accepting or ending a telephone call. In order to trigger this function or these functions, the user thus has to tap with the finger on the housing 10 twice at a short time interval (of approximately 0.2 seconds, for example).

To recognize such a double tap of the user, the finger tap recognition unit 26 monitors the measurement signal M of the acceleration sensor 28. This monitoring either takes place continuously during the entire operation of the hearing aid 4 or—preferably—only in situations in which a double tap of the user is expected, for example, during the announcement of an incoming telephone call (thus, for example, during the playback of a telephone ring tone) to accept the telephone call and/or to end the telephone call during it.

Due to the tapping movement delivered by the user on the housing 10, the hearing aid 4 experiences a characteristic acceleration, which is detected by the acceleration sensor 28. The tapping movement of the user is therefore expressed in a characteristic change of the measurement signal M, which is designated as the "signature" of the tapping movement. The signature of the double tap performed by the user is thus typically expressed in the measurement signal M in two (acceleration) pulses, which are each characterized by a specific direction, a specific time interval, and a specific strength (i.e., a specific maximum value of the acceleration relative to a base value or normal value).

The finger tap recognition unit 26 compares in this case (directly or indirectly) the measurement signal M detected by the acceleration sensor 28 to a specified double tap pattern and, upon recognizing the double tap, triggers the function assigned thereto, thus depending on the context (i.e., the situation in which the double tap was performed), for example, the acceptance of the incoming telephone call or the ending of the telephone call currently being made. In the case of the two above-mentioned functions, the finger tap recognition unit 26 transmits an instruction to the operating app 6 upon recognition of the double tap, which in turn activates the smartphone 8 accordingly.

In the preferred embodiment of the hearing system 2, the double tap pattern contains limiting values or permitted ranges for the time interval, a limiting value for a minimum strength, and a permissible range of the direction of the two acceleration pulses. The finger tap recognition unit 26 determines, for example, for each acceleration pulse of the measurement signal M, which exceeds the specified limiting value for the minimum strength, the respective point in time and the acceleration direction (relative to the hearing aid 4). In this case, it recognizes the signature of the double tap delivered by the user in that the time interval of two pulses meeting this condition is within the permitted range of the acceleration direction and follow one another with respect to time within the specified interval range.

In addition to the double tap pattern, a single tap pattern is also stored in the finger tap recognition unit 26, which in each case contains a limiting value or permitted range for the strength and the direction of the single finger tap (single tap). These limiting values or permitted ranges are defined here such that they correspond to the corresponding dimensions of the double tap pattern. A proper single tap is thus to be executed with the same strength and in the same direction (or at the same point of the hearing aid 4) as the single tapping movements during of a proper double tap.

In an alternative embodiment, the finger tap recognition unit 26 comprises an artificial neural network, which was trained to recognize double taps using corresponding acceleration curves, which contain the signature of proper double taps. The double tap pattern is in this case given by the configuration of the artificial neural network achieved due to the training. In operation of the finger tap recognition unit 26, or in any case in situations in which a double tap of the user is expected, the measurement signal M (in particular a sliding time window thereof), is supplied to the artificial neural network as an input variable. The artificial neural network calculates therefrom an output variable, which indicates the recognition of a double tap either in binary form (double tap recognized or not recognized) or in continuous form (for example, as a probability for the presence of a double tap). The artificial neural network is optionally trained further continuously in operation of the hearing aid 4 on the basis of positive recognition errors (thus sections of the measurement signal M which were incorrectly recognized as a tap event) and is therefore designed as a self-learning system.

In addition to the finger tap recognition unit 26, the hearing system 2 comprises a learning system 30, which is used to train the user for the correct performance of multiple finger taps (double taps here). Like the finger tap recognition unit 26, the learning system 30 is preferably designed as a software module, which is not implemented in the hearing aid 4 in the embodiment according to FIG. 1, however, but rather—if not described otherwise—as part of the operating app 6. In principle, however, the learning system 30 can alternatively also be formed as nonprogrammable hardware (i.e., as a nonprogrammable electronic circuit, in particular in the form of an ASIC or part thereof), or as a combination of nonprogrammable hardware and software.

One preferred embodiment of the learning system 30 is shown in more detail in FIG. 2. Accordingly, the learning system 30 comprises as subunits (for example software modules) a user data unit 32, an interaction detection unit 34, an environmental condition detection unit 36, a multiple tap training unit 38, a single tap training unit 40, an instruction unit 42, and a learning coordination unit 44.

The user data unit 32 is designed to acquire user data N (thus personal data which characterize the user)—for example by means of an input mask displayed via the display of the smartphone 8—and store these data, namely, for example, age of the user, the degree of experience of the user with hearing aids, and the degree of experience of the user with electronic communication devices and digital information.

The interaction detection unit 34 is designed to detect interactions of the user with the hearing aid 4 by means of finger tapping movements (namely in particular performed double taps and single taps), to evaluate them with respect to the frequency and the success, and to store the results of this evaluation. For example, the interaction detection unit 34 detects and stores as interaction data A the number of the double taps recognized (i.e., performed properly) and not recognized (i.e., performed incorrectly) in one or more preceding double tap test steps, and the number of the single taps recognized and not recognized in one or more preceding single tap test steps, wherein the respective stored number of non-recognized double and single taps is set to zero by the interaction detection unit 34 when the user has successfully performed a specified number of double taps or single taps.

The environmental condition detection unit 36 detects a signal-to-noise ratio Q of the measurement signal M of the acceleration sensor 28 as a measure of the quality or reliability of the measurement signal M (or, expressed in reverse, as a measure of the strength of the interference generated by the environmental conditions in the measurement signal M). The signal-to-noise ratio Q is calculated by the environmental condition detection unit 36, for example, from the ratio of an average strength of preceding acceleration pulses, the strength of which exceeds a specified limiting value (and which the environmental condition detection unit 36 therefore interprets as the signature of finger taps of the user) to a baseline of the measurement signal M (which is calculated, for example, from a sliding root mean square over the entire measurement signal M).

In a variant of the learning system 30, the environmental condition detection unit 36 is implemented as part of the operating app 6 and is accordingly executed in operation of the hearing system 2 in the smartphone 8. In this case, the measurement signal M is transmitted from the hearing aid 4 via the data transmission link 24 to the smartphone 8 (and thus to the operating app 6). Alternatively thereto, the environmental condition detection unit 36 is implemented in the audio processor 18 of the hearing aid 4. In the latter case, only the determined signal-to-noise ratio Q is transmitted from the hearing aid 4 to the operating app 6.

The multiple tap training unit 38 is designed to carry out a double tap test step described in more detail hereinafter. The single tap training unit 40 is designed to carry out a single tap test step described in more detail hereinafter. The instruction unit 42 is designed to output stored instructions L (i.e., learning information to inform the user about the correct performance of double taps) to the user.

The learning coordination unit 44 is finally designed, depending on the user data N stored in the user data unit 32, depending on the interaction data A stored in the interaction detection unit 34, and depending on the signal-to-noise ratio Q stored in the environmental condition detection unit 36, by way of an activation of the multiple tap training unit 38, the single tap training unit 38, and the instruction unit 42 (indicated by dashed arrows in FIG. 1), to coordinate a single step or multistep learning process by which the user is introduced to and trained in the proper performance of double taps. The user data N, the interaction data A, and the signal-to-noise ratio Q are supplied for this purpose to the learning coordination unit 44 from the user data unit 32, the interaction detection unit 34, and the environmental condition detection unit 36, respectively.

The learning coordination unit 44 starts the learning process upon the initial startup of the hearing system 2, in case of an incorrectly performed (i.e., not recognized) double tap, and upon request of the user (for example, when the user actuates a corresponding button in a user interface of the operating app 6).

In one exemplary embodiment of the learning coordination unit 44, when the age of the user according to the user data N falls below a specific age limiting value (of, for example, 60 years), the user has an average to high degree of experience with hearing aids and electronic communication devices/digital information according to the user data N, and the interaction data A do not have any failed attempts in performing double taps, it immediately activates the multiple tap training unit 38 to carry out the double tap test step. When the double tap performed by the user is recognized in this case, the multiple tap training unit 38 sends a positive test result R to the interaction detection unit 34. In this case, the learning process (which possibly consists of a single step here) is ended. Otherwise, the multiple tap training unit 38 reports a negative test result R to the interaction detection unit 34, which updates the interaction data A on the basis of the test result R.

When one of the above conditions is not met, i.e., when the user exceeds the age limiting value or has a low degree of experience with hearing aids or electronic communication devices/digital information, or the interaction data A have a number of failed attempts not equal to zero, the learning coordination unit 44 compiles a multistep learning process, which—depending on the number of the prior failed attempts—comprises the following steps

- for no or one prior failed attempt: activating the instruction unit 42 to output an instruction L to the user, followed by an activation (possibly multiple in case of error) of the multiple tap training unit 38,
- for multiple prior failed attempts: activating the instruction unit 42 to output an instruction L to the user, followed by an activation (possibly multiple in case of error) of the single tap training unit 40; in turn followed by an activation (possibly multiple in case of error) of the multiple tap training unit 38—individual tapping movements are thus initially trained here, before the double tapping movement is trained again.

For a higher number of failed attempts, the learning coordination unit 44 aborts the learning process and offers establishing a telephone or video connection to an audiologist or scheduling an appointment for a consultation with an audiologist to the user via the user interface of the operating app 6.

The signal-to-noise ratio Q is taken into consideration by the learning coordination unit 44, for example, in that the multiple tap training unit 38 is always activated repeatedly (for example three times) in succession when the signal-to-noise ratio Q falls below a specified limiting value, while the multiple tap training unit 38 is only activated once with good signal-to-noise ratio Q.

In the course of the double tap test step, the multiple tap training unit 38 initially outputs a double tap prompt to perform a double tap to the user. It then activates the finger tap recognition unit 26. Upon recognition of the double tap carried out by the user by the finger tap recognition unit 26 or otherwise after passage of a specified waiting time, the multiple tap training unit 38 outputs feedback to the user in which it informs the user of the recognition or nonrecognition of the double tap.

In the example described here, the multiple tap training unit 38 outputs the double tap prompt in the form of a simulated telephone call in that—after output of corresponding information via the user interface of the operating app 6 and possibly a release by the user—it outputs a ring tone via the receiver 14 of the hearing aid 4. In order to assist the user in performing the double tap, the ring tone is preferably designed here such that it has a rhythm corresponding to the expected double tap. For example, the ring tone consists of a multiple sequence of clicking sounds; for example, in each case two successive clicking sounds at a short time interval (of, for example, 0.2 seconds), followed by a longer pause (of, for example, 1 second). The short time interval is selected here such that it corresponds to the time interval required by the double tap pattern of the finger tap recognition unit 26 between the single taps of a proper double tap. The user therefore only has to tap according to the ring tone in order to perform the double tap at the expected frequency.

When generating the feedback, the multiple tap training unit 38 takes the interaction data A into consideration in that in the absence of prior failed attempts, it only outputs nonspecific feedback (e.g.: "double tap recognized" or "double tap not recognized"), while in the case of prior failed attempts, it generates specific feedback on errors with respect to the tapping speed, the tapping strength, or the tapping direction or the tapped point of the hearing aid 4 (e.g.: "tapping too weak", "tapping too strong", "tapping too fast", "tapping too slow", "tapping too high", etc.). Instead of a description of the error (for example: "tapping too weak"), the feedback can also contain a recommendation for improved tapping behavior (for example: "please tap harder"). The tapping speed, the tapping strength, and the tapping direction are thus trained individually and independently of one another by the differentiated feedback. The feedback is alternately output in text or graphic form via the user interface of the operating app 6 or—above all upon successful recognition of a double tap—acoustically via the receiver 14 of the hearing instrument 4.

The multiple tap training unit 38 optionally prompts the user in the course of the simulated telephone call to deliver a speech sample, which is recorded by the multiple tap training unit 38 and then played back to the user via the receiver 14.

Furthermore, the multiple tap training unit 38 optionally prompts the user in the course of the simulated telephone call to end this telephone call by way of a further double tap. The user also receives feedback in this case as to whether the further double tap was recognized, preferably in the form of a text or a graphic output via the user interface of the operating app 6.

In the course of the single tap test step, the single tap training unit 40 initially outputs a single tap prompt to perform a single tap to the user. It then activates the finger tap recognition unit 26. Upon recognition of the finger tap carried out by the user by the finger tap recognition unit 26 or otherwise after passage of a specified waiting time, the single tap training unit 38 outputs feedback to the user in which it informs the user about the recognition or nonrecognition of the single tap. This feedback preferably always comprises upon nonrecognition of the proper single tap a specific specification of errors with regard to the tapping strength or the tapping direction or the tapped point of the hearing aid 4.

The single tap training unit 40 also reports test results R about successful and failed single taps to the interaction detection unit 34, which adapts the interaction data A accordingly. The test results R are taken into consideration by the learning coordination unit 44, for example, in that it activates the single tap training unit until the user has performed a specified number of successfully recognized single taps.

The single tap training unit 40 optionally takes into consideration the user data N in a differentiated embodiment of the single tap test. For example, the single tap training unit 40 carries out the single tap test step in the form of a computer game for a young user, in which the user has to control a game figure along a specified path by means of single taps, while the single tap training unit 40 outputs the single tap prompt and the feedback in text form via the user interface of the operating app 6 for an older user.

The instruction unit 42 preferably also takes into consideration the user data N, in that depending on the age and the experience of the user, it selects a version—which is particularly suitable according to expectations—depending on the age and the experience of the user from various versions of the instructions, in particular various training videos and/or various preparation forms (e.g., training video, text-based instruction, graphics-based instruction).

In further embodiments of the invention, the finger tap recognition unit 26 is designed to trigger an action of the hearing aid 4 itself upon recognition of a double tap, for example, a change between various hearing programs of the signal processing.

The invention is particularly clear from the above-described exemplary embodiments, but nonetheless is not restricted to these exemplary embodiments. Rather, further embodiments of the invention can be derived by a person skilled in the art from the claims and the preceding description.

LIST OF REFERENCE SIGNS

2 hearing system
4 hearing aid
6 operating app
8 smartphone
10 housing
12 microphone
14 receiver
16 battery
18 audio processor
20 sound passage
22 tip
24 data transmission link
26 finger tap recognition unit
28 acceleration sensor
30 learning system
32 user data unit
34 interaction detection unit
36 environmental condition detection unit
38 multiple tap training unit
40 single tap training unit
42 instruction unit
44 learning coordination unit
A interaction data
I (input) audio signal
L instruction
M measurement signal
N user data
O (output) audio signal
Q signal-to-noise ratio
R test result
U supply voltage

The invention claimed is:

1. A method for operating a hearing instrument worn in or on an ear of a user, the method comprising:

providing a hearing instrument that is configured for triggering an action of the hearing instrument or an external functional unit connected to the hearing instrument by way of a multiple finger tap on the hearing instrument;

performing a multiple tap test step by:

outputting a multiple tap prompt to the user to execute the multiple finger tap;

detecting a measurement signal by a sensor integrated in the hearing instrument, the measurement signal containing a signature of the executed multiple finger tap;

comparing the measurement signal with a stored multiple tap pattern for the multiple finger tap; and outputting feedback to the user as to whether the signature contained in the measurement signal corresponds to the multiple tap pattern.

2. The method according to claim 1, wherein the multiple tap pattern contains a threshold or a permitted range for:

a time interval between the pulses of the signature caused by the multiple finger tap; and an amplitude of the pulses of the signature caused by the multiple finger tap.

3. The method according to claim 2, which comprises, when the measurement signal does not correspond to the stored multiple tap pattern with respect to the time interval or the amplitude of the pulses, outputting the feedback to the user containing information about a deviation of the time interval or the amplitude from the respective stored threshold value or permitted range.

4. The method according to claim 1, wherein the sensor is an acceleration sensor or a gyroscopic sensor and the measurement signal reflects an acceleration or a rotational movement acting on the hearing instrument, and the comparing step comprises comparing only a predetermined directional component of the measured acceleration or rotational movement to the multiple tap pattern or wherein the multiple tap pattern contains a threshold value or permitted range for the direction of the acceleration pulses or rotational movement pulses caused by the multiple finger tap.

5. The method according to claim 4, which comprises, when the measurement signal does not correspond to the stored multiple tap pattern with respect to a direction of the acceleration pulses or rotational movement pulses, outputting the feedback to the user with information about the deviation of the direction from the respective stored threshold value or the permitted range.

6. The method according to claim 4, which comprises calculating a location of the multiple finger tap relative to the hearing instrument from the direction of the acceleration pulses or rotational movement pulses, and when the measured acceleration does not correspond to the stored multiple tap pattern with respect to the direction of the acceleration pulses, outputting the feedback to the user with information about the deviation of the location of the finger tap from a target position corresponding to the multiple tap pattern.

7. The method according to claim 1, wherein the action to be triggered by the multiple finger tap consists of accepting or ending a telephone call, and the method comprises outputting the multiple tap prompt in the form of a simulation of a telephone call in the multiple tap test.

8. The method according to claim 1, which comprises outputting to the user together with, or subsequently to, the multiple tap prompt, a rhythmic prompt sound to assist the user in an execution of the multiple finger tap by way of the hearing instrument, wherein a rhythm of the rhythmic prompt sound correlates with a timing sequence of individual expected single taps within the multiple tap pattern.

9. The method according to claim 1, which comprises, in addition to carrying out the multiple tap test step, carrying out a single tap test step by:

outputting to the user a single tap prompt to execute a single finger tap;

detecting with the sensor that is integrated in the hearing instrument a measurement signal containing a signature of the executed single finger tap and comparing to a stored single tap pattern for the single finger tap; and outputting feedback to the user as to whether the signature contained in the measurement signal corresponds to the single tap pattern.

10. The method according to claim 9, wherein the single tap pattern corresponds to the multiple tap pattern with respect to an amplitude or a direction of a pulse of the measurement signal caused by the single finger tap.

11. The method according to claim 1, which comprises, in addition to carrying out the multiple tap test step, carrying out an instruction step by outputting to the user an instruction to carry out the multiple finger tap.

12. The method according to claim 11, wherein the instruction step comprises selecting the instruction to be output to the user from multiple different variants of the instruction depending on personal data on the user.

13. The method according to claim 1, which comprises carrying out one or more further auxiliary steps selected from the group consisting of:

a single tap test step that comprises:

outputting to the user a single tap prompt to execute a single finger tap;

detecting with the sensor that is integrated in the hearing instrument a measurement signal containing a signature of the executed single finger tap and comparing to a stored single tap pattern for the single finger tap; and outputting feedback to the user as to whether the signature contained in the measurement signal corresponds to the single tap pattern, an instruction step that comprises:

outputting to the user an instruction to carry out the multiple finger tap; and a multiple execution of the multiple tap test step; and depending on at least one of personal data on the user, a preceding interaction of the user with the hearing instrument, or at least one environmental condition, making a selection about the type and number of the further auxiliary steps and a sequence of the multiple tap test step and the further auxiliary steps.

14. The method according to claim 1, which comprises varying a performance of the multiple tap test step in dependence on at least one of:

personal data on the user;

a preceding interaction of the user with the hearing instrument, or at least one environmental condition.

15. The method according to claim 1, wherein the multiple finger tap is a double finger tap.

16. A hearing system, comprising:

a hearing instrument to be worn in or on the ear of a user;

said hearing instrument has a sensor configured to output a measurement signal which contains a signature of a multiple finger tap when the user executes a multiple finger tap on the hearing instrument;

a finger tap recognition unit configured to recognize the multiple finger tap on the hearing instrument by comparing the measurement signal to a stored multiple tap pattern and, upon recognizing the multiple finger tap, to trigger an action of said hearing instrument or of an external functional unit connected to said hearing instrument; and a learning system configured to carry out the method according to claim 1.

* * * * *